United States Patent [19]
Barloy

[11] Patent Number: 6,116,431
[45] Date of Patent: Sep. 12, 2000

[54] FILTER PAN CONSTRUCTION

[75] Inventor: Michel Barloy, Mulberry, Fla.

[73] Assignee: Bartec, New York, N.Y.

[21] Appl. No.: 09/285,466

[22] Filed: Apr. 2, 1999

[51] Int. Cl.[7] .................................................... B01D 33/23
[52] U.S. Cl. ......................... 210/455; 310/459; 310/489; 310/328; 310/344
[58] Field of Search ..................................... 210/324, 328, 210/330, 331, 339, 344–347, 486, 489, 495, 498, 455, 459, 462

[56] References Cited

U.S. PATENT DOCUMENTS

| | | | |
|---|---|---|---|
| 3,216,576 | 11/1965 | Roos | 210/344 |
| 3,482,702 | 12/1969 | Edwards . | |
| 4,391,706 | 7/1983 | Steinkraus | 210/344 |
| 5,124,037 | 6/1992 | Barloy | 210/328 |
| 5,589,081 | 12/1996 | Harris . | |
| 5,707,535 | 1/1998 | Harris . | |
| 5,738,787 | 4/1998 | Alexander et al. . | |

*Primary Examiner*—Matthew O. Savage
*Attorney, Agent, or Firm*—Larson & Taylor, PLC

[57] ABSTRACT

A horizontal circular filter is provided which includes plural filter pans arranged in a circle and rotatable as a group around a fixed central vacuum box. The filter pans are connected to respective sections of the vacuum box by respective manifolds which rotate with the filter pans. Each of the filter pans comprises a pan having a flat bottom wall including plural filtrate drainage troughs therein. A removable, disposable, plastic channel-forming grid is positioned on the bottom wall between the side walls of the pan. A filter cloth is disposed over the grid, and a cloth "caulking" arrangement secures the filter cloth in place so as to also hold the grid in place in the pan. A method of retrofitting existing punched plate filter pans is also provided.

10 Claims, 5 Drawing Sheets

FILTER PAN CONSTRUCTION

FIELD OF THE INVENTION

The present invention generally relates to horizontal circular rotary filters such as are typically used in the manufacture of phosphoric acid by sulfuric acid attack and, more particularly, to an improved filter pan for such filters.

BACKGROUND OF THE INVENTION

Although the invention is not limited to such applications, in the manufacture of phosphoric acid by the method described above, ground phosphate rock is continuously introduced with sulfuric acid in an agitated reaction volume containing the products of the main chemical reaction, viz., solid calcium sulphate and liquid phosphoric acid. These products are separated by filtration to recover the phosphoric acid while calcium sulphate, which may have different forms of hydration, is generally dumped as a waste material having no value.

The filter used in the liquid-solid separation process described above is an expensive piece of equipment which is critical to the process. In this regard, the separation must be as complete as possible in order to recover the maximum phosphoric acid. For this purpose, after extracting as much mother liquor as possible, the cake is washed several times (typically two or three times) in a countercurrent process with the make-up water which will end up in the reactor system as the process water needed to adjust the strength of the product phosphoric acid. The filter size is governed by the quantity and filterability of the solids and by the ability of the filter to drain the liquid as fast as possible to provide an increased filtration rate and sharper separation of filtrates of different qualities.

The present invention is related to horizontal circular filters of two types, tilting pan filters and table filters. The invention is particularly advantageous when applied to tilting pan filters because such filters can be easily and readily retrofitted to use the invention, and thus such tilting pan filters will be further described by way of additional background.

Referring to FIG. 1, the basic steps in a tilting pan filter cycle are shown. The filter, which is generally denoted 10, is circular as shown in FIG. 2, but, for purposes of clarity, is represented as a linear projection, in FIG. 1. Each pan 12 of the filter 10 receives a batch of slurry coming from the reactor tank. When most of the mother liquor has been extracted, as shown at the left of FIG. 1, the surface of the filter cake looks dry, and the cake is then washed with a solution of phosphoric acid at low concentration. The latter step is referred to as a first wash, and is indicated in FIG. 1, while the liquid extraction is referred to as dewatering. In a typical two wash filter, subsequent to dewatering after the first wash, the cake is again washed with water, in a step referred to as the second wash, and the filtrate is sent back to filter 10 for the first wash, as indicated by arrowed path 14. There may be more than two washes, depending on the water balance of the process. After the final dewatering, the pan tilts, as indicated for pan 12a in FIG. 1 (and is also shown in FIG. 2), to completely dump the solid filter cake, as indicated for pan 12b in FIG. 1. The filter cloth is then washed with water as indicated for pan 12c, and then the pan is again rotated, as indicated for pan 12d, so as to come back to the original upright position and thus be ready for a new cycle.

The filtrates for each stage of filtration, referred to the first, second and third filtrates in the example shown in FIG. 1, are collected separately. More specifically, referring to FIG. 2, wherein only a few pans 12 are shown for purposes of clarity, a manifold 16 is connected to rotate with pans 12 above a fixed circular vacuum box 18. The latter is divided by radial partitions to collect the filtrates of different qualities. Each filtrate has a different use in the process and it is important to sharply separate them.

After washing the filter cloths with water, the water must be drained from the pans 12 as thoroughly as possible before receiving the next batch of slurry, otherwise dilution occurs, i.e., the mother liquor is diluted with water. If dilution occurs, an expensive evaporation step is then required as the next step in the process. To obtain maximum filter efficiency in terms of capacity, mother liquor recovery and low dilution, it is important that the filtrates be drained as fast as possible.

To summarize and expand on the foregoing, the main required qualities of the filter, particularly for a phosphoric acid application, are the following: (1) to drain the filtrates rapidly from the filtration support to the collecting device so as to increase the production rate and improve the product acid quality. In this regard, because the first filtrate is contaminated by water not drained from the pans after the cloth wash and by solids going through the cloths before a pre-coat of solids is formed, the quantity of this first filtrate must be as small as possible to be discarded outside the product acid; (2) to provide about the same travelling time for the filtrates from any point of the pan surface to the collecting device since, otherwise, the separation of filtrates of different strengths recovered in the collecting device will not be sharp and will decrease both the filter capacity and the extraction efficiency; (3) to provide a cloth support with a ratio of void area to total surface area (void percentage) as high as possible so as to increase both the filtration rate and the extraction efficiency; (4) to provide minimum scaling of the pans such as occurs with cooling by precipitation of salts dissolved in the phosphoric acid; (5) to provide easy access to the bottom of the pans so as to enable mechanical removal of any scaling that is formed; and (6) to provide a small air "hold-up" for limiting the capacity of the vacuum pump removing this air.

Turning now to a consideration of prior art filter pans, originally the cloth support was a perforated rubber mat resting on the flat bottom of the pan. The filtrates traveled on this flat bottom to a corner of the pan where the filtrates were collected. This device had many disadvantages, including, in particular, the low drainage provided by the horizontal surface as well as scaling problems, and has been completely abandoned.

The device described above was replaced by a corrugated plate tack-welded on the bottom of the pan, thereby allowing the filtrate and the air to travel in narrow parallel channels at relatively high velocity. The device is efficient in providing the fast drainage of the filtrates, but suffers important disadvantages. For example, after operation over time, the corrugated plates have been found to be corroded, deformed and scaled. This device has also been abandoned due to these operational problems.

In the next device of interest, a sloped bottom of the pan is covered with a horizontal punched plate which is used as the cloth support with 35 to 45% void opening. Most of the circular filters in operation today in the phosphoric acid industry are of this type. The advantages over the former designs are that there is more room underneath the cloth support with less need for frequent cleaning and there is provided faster drainage of the filtrates than is provided by a horizontal flat bottom. The drawbacks include the following: difficulties in cleaning and removing the scale through the holes of the welded punched plates; the relatively low void ratio of the cloth support; vortices are formed in some holes perforating the cloths and even the pans; cracks occur in the punched plates due to alternative flexing thereof; and high manufacturing cost. Moreover, the apparent advantage of fast drainage is, in fact, offset by the build-up of scale which slows down the filtrates drainage.

In recent testing and industrial applications, a device has been used which includes a horizontal grooved polyethylene plate or grate supporting the cloth. The concept is similar to the corrugated plate described hereinabove. Industrial runs have shown that this device drains the filtrates faster than a sloped bottom pan and increases the productivity and efficiency of the filter. Compared to the stainless steel corrugated plate, this grate has the advantage of having less tendency to scaling due to the smoother material used, but has the disadvantage of a decreased void surface, typically 45%. After some industrial experience with this device, two further problems appeared: (1) the grates lift up due to buildup underneath thereof of salts and a poor fixation of the grates which is difficult to improve; and (2) a small hole in the cloth spreads rapidly due to the insufficient cloth support on too large channels. Other disadvantages include the relatively high cost of the grates due to the machining of the grooves required and the type of fixation needed, and leakage of liquid between the grate and the pan bottom results in scaling in this space and decreases the filter efficiency.

A more recent device used in industrial application is similar to the corrugated plate support device with the difference that the bottom of the pan itself is corrugated, in contrast to the thin tack welded corrugated plate described hereinabove. In order to limit the cooling effect due to the extended surface, the outside bottom of the pan must be thermally insulated with a special coating. Important disadvantages include the high manufacturing cost and the large surface exposed to scaling.

In all filter constructions described above, except for the abandoned rubber mat device, the filtrates coming from any point of the cloth are drained into a large sloped channel which is indicated at 20 in FIG. 2 and extends along the pan axis.

SUMMARY OF THE INVENTION

In accordance with the invention, an improved filter pan construction is provided which affords the required qualities set forth above and which overcomes, or substantially overcomes, the various disadvantages of the prior art just discussed.

According to a first aspect of the invention, a filter pan construction is provided which comprises: a pan including side walls and a flat bottom wall having at least one filtrate drainage trough therein; a removable, channel-forming grid disposed on said flat bottom between said side walls; and a filter cloth disposed over said grid and holding said grid in place in the pan.

The grid preferably comprises a disposable plastic grid member. Advantageously, the plastic grid member is comprised of a high density polyethylene.

In a preferred embodiment, the grid comprises a plurality of spaced channel-forming elements joined together by a plurality of securing elements. In one beneficial implementation, the channel-forming elements of the grid extend transversely to the longitudinal axis of the filter pan. Advantageously, the securing elements extend orthogonally to the channel-forming elements and longitudinally of the axis of the pan. In one important embodiment, the securing elements comprise elongate strand members affixed to the tops of the channel-forming elements. Other important embodiments and configurations are described hereinbelow.

The bottom wall of the pan preferably includes a plurality of troughs therein. Advantageously, the bottom wall includes a central longitudinally extending trough and first and second further troughs disposed on opposite sides of the central trough and extending at an angle to the central trough so as to intersect the central trough at a common site along the length of the central trough.

A further important feature of the invention concerns the use of a relatively thin plate as the bottom wall and the provision of external reinforcement elements secured to a bottom surface of the bottom wall.

The filter pan construction further comprises holding means for holding the filter cloth in place, and, in a preferred embodiment, the side walls include an inwardly directed bottom channel and the holding means include an elongate resilient member disposed in the bottom channel about which a portion of an edge of the filter cloth is wrapped. In one advantageous embodiment, the elongate resilient member comprises an inflatable tube which can be inflated with air, water or the like.

In accordance with a further aspect of the invention, a horizontal circular filter is provided comprising a plurality of filter pans which are arranged in a circle and rotatable as a group around a fixed central vacuum box, and which are connected to respective sections of the vacuum box by respective manifolds that rotate with the filter pans, each of the filter pans comprising a pan including side walls and a bottom wall having at least one filtrate drainage trough therein; a removable, disposable, plastic channel-forming grid positioned on the bottom wall between the side walls; a filter cloth disposed over the grid; and means for securing the filter cloth in place so as to also hold the grid in place in the pan.

As in the first aspect of the invention, the grid is preferably comprised of a high density polyethylene.

As above, the grid preferably comprises a plurality of spaced channel-forming elements joined together by a plurality of securing elements. In one beneficial embodiment, channel-forming elements extend transversely to the pan axis, and the securing elements extend orthogonally to the channel-forming elements and longitudinally of said axis, although, again, other grid configurations (e.g., a lozenge-shaped gridwork) are also useful.

In accordance with yet another aspect of the invention, a method is provided for retrofitting a filter pan for a horizontal circular filter, wherein the filter pan has a bottom wall including at least one drainage trough and a punched plate disposed on said bottom wall, and the method comprises the steps of: covering the punched plate with a covering which overlies the bottom wall except for the at least one drainage trough, placing a removable channel-forming grid on the covering member, placing a filter cloth over the grid, and securing the filter cloth in place so as to also fix the channel-forming grid in place. The covering step preferably comprises using a covering comprising a thin stainless steel plate.

Further features and advantages of the present invention will be set forth in, or apparent from, the detailed description of preferred embodiments thereof which follows.

DESCRIPTION OF THE PREFERRED EMBODIMENTS

Figure 1:
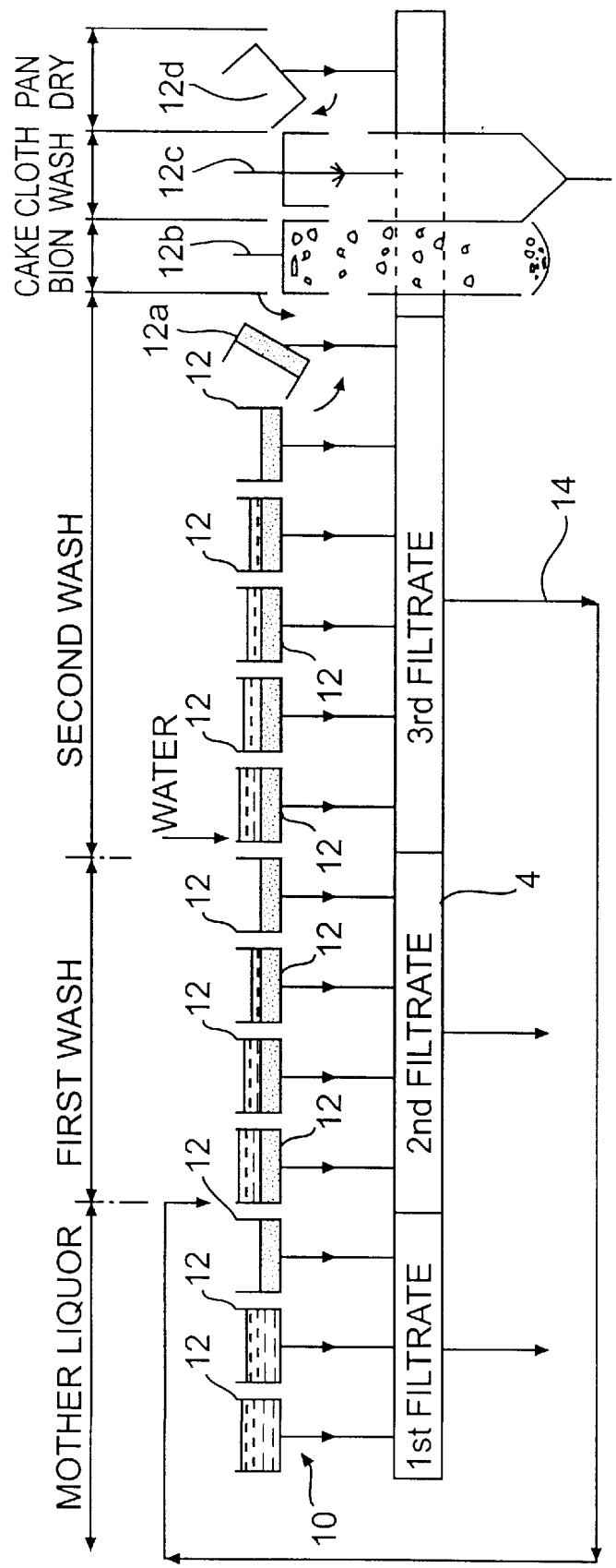
FIG. 1, which was described above, is a schematic linear projection of a typical tilting pan filter system illustrating the basic overall operation thereof.
Figure 2:
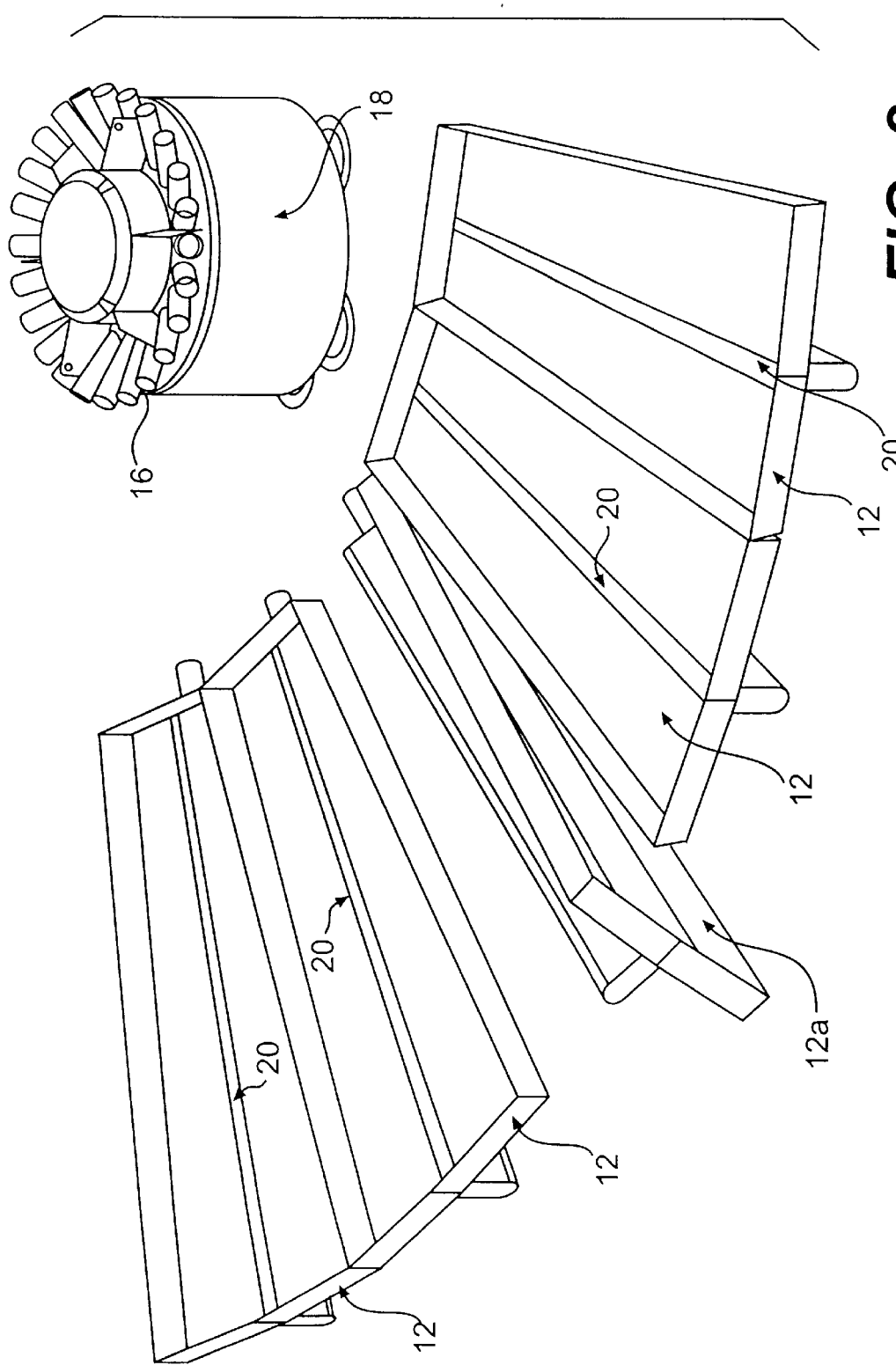
FIG. 2, which was also described above, is a perspective view, partially broken away, of a part of the filter system of FIG. 1.
Figure 3:
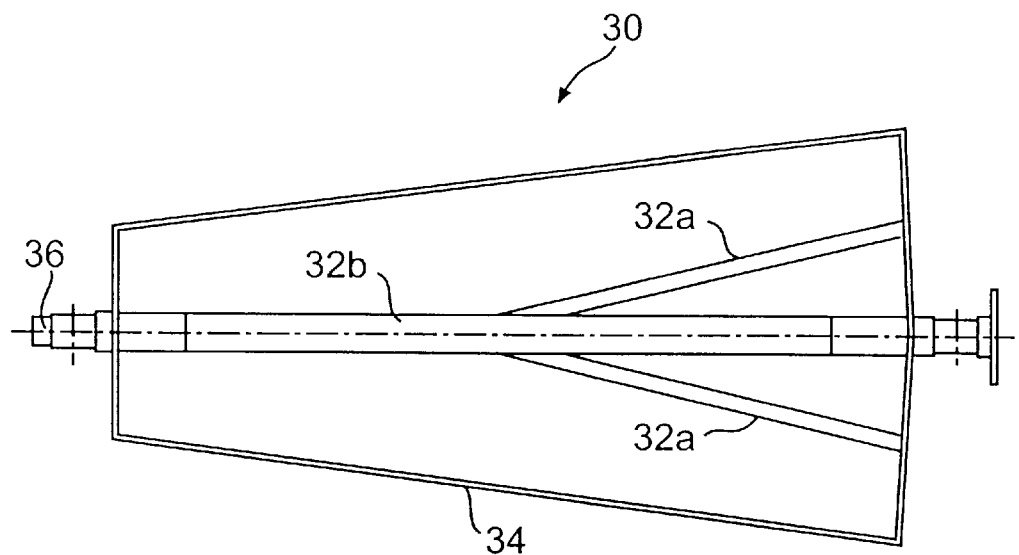
FIGS. 3 to 6 are, respectively, a top plan view, a side elevational view, transverse cross sectional view, and a perspective view, of a filter pan in accordance with the invention.
Figure 4:
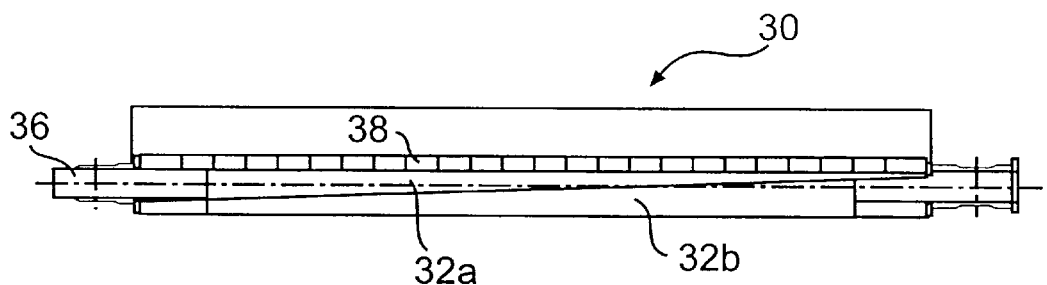
Figure 5:
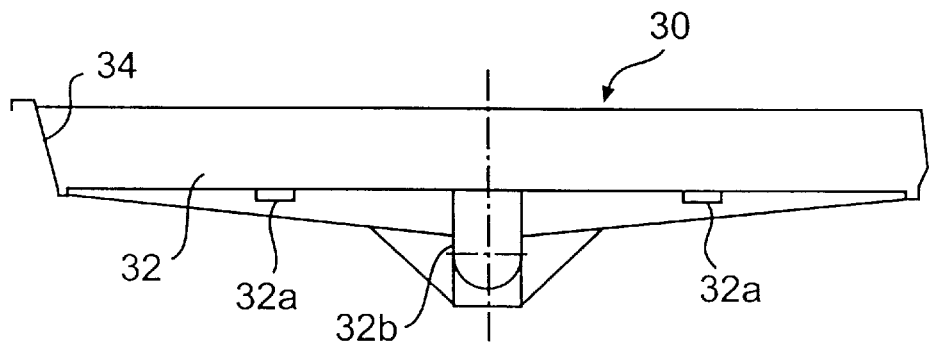
Figure 6:
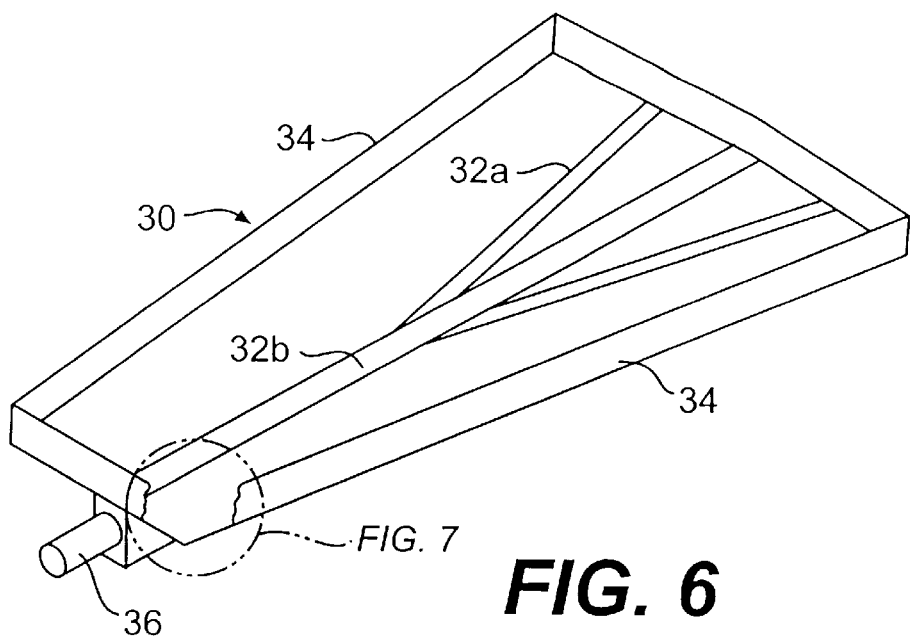

Referring to FIGS. 3 to 10, there is shown a preferred embodiment of the filter pan of the invention. The basic filter pan, which is generally denoted 30, is best seen in FIGS. 3 to 6 and includes a flat bottom 32 and side walls 34. As shown, pan 30 is of a conventional truncated "wedge" or "pie" shape. The flat bottom 32 includes two side troughs 32a and one central trough 32b. The central trough 32b is connected to a corresponding manifold (a portion of which, denoted 36, is shown in FIGS. 3, 4 and 6) in a conventional manner so that filtrates collected therein can be transported to a standard, fixed circular vacuum box such as that shown at 18 in FIG. 2. In general, a filter pan in accordance with the invention includes one, two or three collecting troughs depending on the size of the pan. Increasing the number of troughs decreases the path length over which the filtrate must travel and thus reduces the overall travel time of the filtrates throughout the pan.

Figure 7:
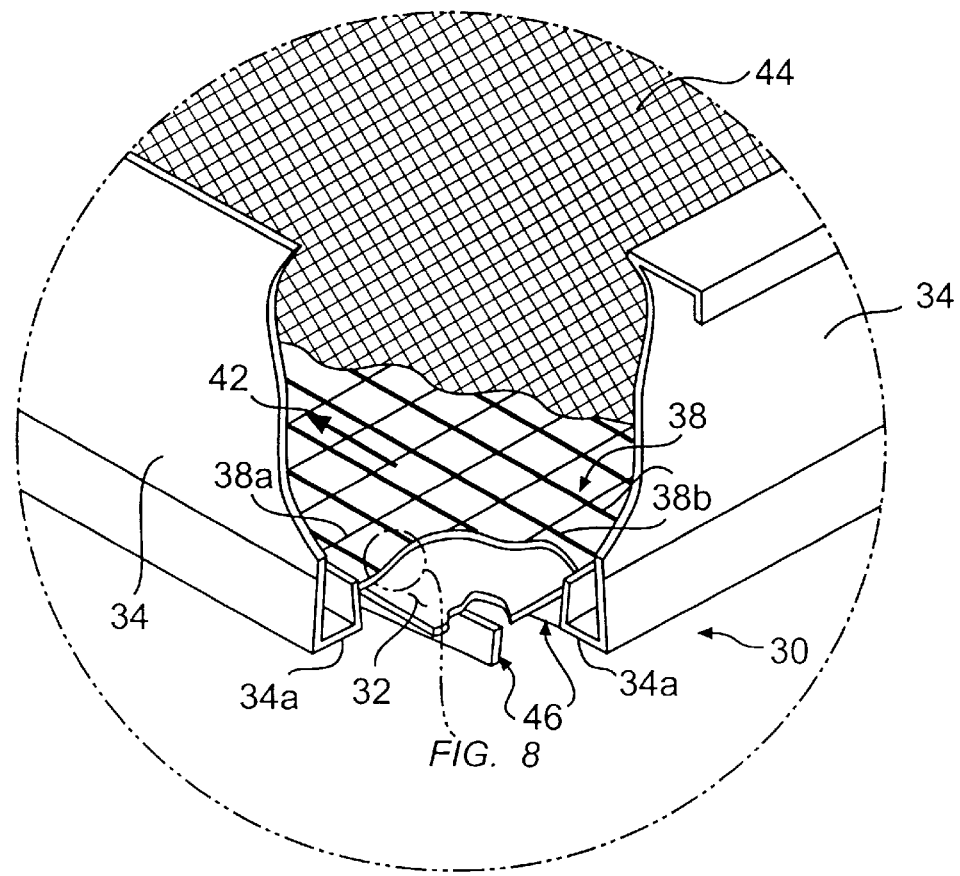
FIG. 7 is a perspective view drawn to an enlarged scale, of a detail of FIG. 6 showing the grid or grate assembly of the invention.
Figure 8:
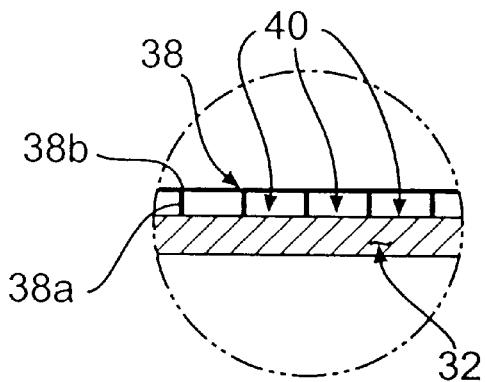
FIG. 8 is a side elevational view, drawn to an enlarged scale of a detail of FIG. 7, showing an embodiment of the grid structure of the invention.
Figure 9A:
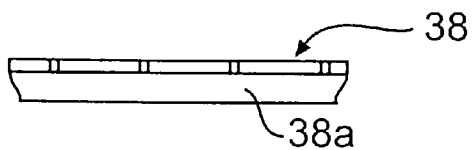
FIGS. 9(a) and 9(b) are a top plan view and side elevational view, respectively, of the grid structure of FIGS. 7 and 8.
Figure 9B:
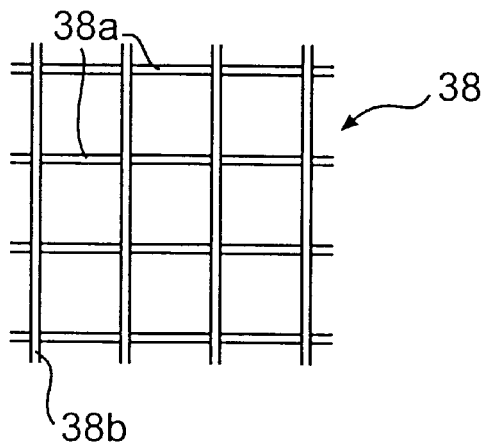

Referring to FIG. 7, the portion of pan 30 that is circled and broken away in FIG. 6 is shown, drawn to an enlarged scale. As indicated in FIG. 7, the flat bottom plate 32 is covered by a plastic grate or grid 38 (which is also indicated schematically in FIG. 4). As is perhaps best seen in FIG. 8, wherein the portion of the grid 38 that is circled and broken away in FIG. 7 is shown in more detail (although FIG. 8 is a cross sectional view), grid 38 comprises lower or depending transversely extending, channel-forming elements 38a disposed underneath and joined together by orthogonal, longitudinally extending upper elements or strands 38b. FIG. 8 is an end view looking down the channel-forming elements 38a and shows the channels 40 formed thereby. FIGS. 9(a) and 9(b) are a top plan view and a side elevational view, respectively, of the grid or grate 38, also showing elements 38a and 38b. Arrow 42 in FIG. 7 shows the direction of acid flow. It should be understood that although the channels 40 are shown extending perpendicular to pan axis, the channels can extend at angle to this axis and the device 30 still provide the benefits of the invention. The grid 38, which is preferably made of an extruded High Density Polyethylene (HDPE), has large void surface which may range from 60% to 85%. The grid 38 is also light in weight and has a smooth surface which is resistant to scaling.

The grid 38 supports a conventional filter cloth 44 and because the grid 38 is a mesh as well as a channel, in contrast to prior art devices which simply employ a channel, wear and tear on the cloth 44 is significantly reduced. Moreover, the grid 38 is simply laid or placed on the bottom plate 32 of the pan 30 and is held in this position by the cloth 44 so that there is no need for mechanical fixation of the grid or grate as in prior art devices. Further, the grid 38 can be easily removed to enable cleaning of the bottom 32 of pan 30, as needed. The plastic grid 38 is of very low cost and hence is a disposable part that can be readily replaced for any reason.

The cross section of channels 40 is chosen to provide optimum filtrate and air velocity, and these can be different depending on the usage of, and load on, the filter. If the channels 40 are full of liquid, they are air tight and the vacuum underneath the cloth 44 may still be high enough for fast draining of the filtrate. If pan 30 is essentially dry, the small quantity of liquid in the channels 40 is carried over by the high air velocity. In both cases, the travel time of the liquid in the channel 40 is a minimum, thereby resulting in high filter efficiency.

There is an optimum channel cross section for the grid 38 and this is related to use of the filter and to the current operating conditions the filter pan of the invention is capable of addressing this issue. In this regard, because the grid 38 is not an integral part of the pan 30 as in prior art pans, the grid 38, and the associated filter cloth 44, can be readily replaced, as desired, with a grid having channels which are, e.g., better adapted to changed operating conditions.

As indicated above, the pan bottom 32 is flat and, in order to provide sufficient rigidity, stiffeners 46 are preferably welded underneath the bottom 32. The stiffeners 46 can be made of a less expensive stainless steel than is used in existing pans wherein the supports for the punched plate are located inside the pan in contact with the corrosive liquid.

The flat bottom 32 of pan 30 also decreases the distance between tilting axis and the top of the pan, and as a result, there is increased clearance between the tilted side top of the pan and the next pan. This permits the pan width to be increased over that of existing pans for the same clearance, and thus for the active surface of the pan to be correspondingly increased.

Figure 10:
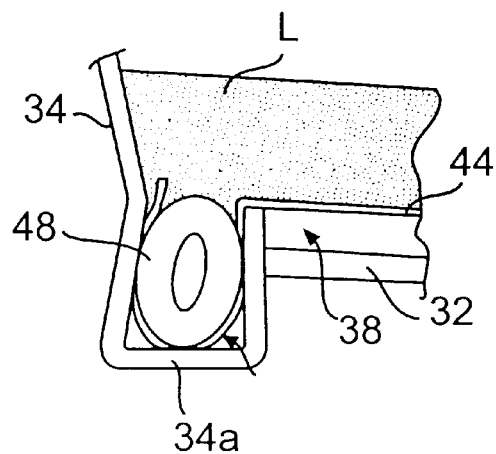
FIG. 10 is a cross sectional view of a preferred cloth "caulking" arrangement.

Referring to FIG. 10, there is shown a preferred embodiment of the cloth "caulking" arrangement for the grid assembly of the invention. As is also shown in FIG. 7, the side walls 34 of pan 30 include generally U-shaped channels 34a at the bottoms thereof. The filter cloth 44 which holds grid 38 in place is itself held in place by a rubber tube 48, or a like resilient element which is forced down into a respective channel 34a, and about which the edge of cloth 44 is wrapped, as shown. In one preferred embodiment, the tube 48 is inflated with air or water to increase the holding and sealing force exerted thereby. This cloth caulking arrangement provides an excellent seal against leakage of the liquid (denoted L in FIG. 10), in the pan 30, as well as leakage of atmospheric air. It will be understood that one important cause of pan scaling is the leakage of atmospheric air through the cloth caulking arrangement. It will be understood that the invention is not limited to the caulking arrangement shown and that the grid of the invention can be used with pans having any suitable kind of cloth caulking system.

The present invention is also applicable, as a retrofit unit, to existing pans having a punched plate as described above. The punched plate would simply be covered with a thin plate or layer of a suitable material except for above the drainage channel along the pan axis. The existing caulking device of the pan to be retrofit could also be used or could be replaced, as desired.

In a specific retrofit example, the punched plate of an existing trapezoidal shaped pan, which is 129 inches long, 69 inches at the large end and 34 inches at the small end, was covered by a plain thin stainless steel plate except for the axial channel of the pan. The stainless steel plate was then covered by a grid in accordance with the invention corresponding to, e.g., grid 38 described above. The grid is held in place by the filter cloth, corresponding to filter cloth 44, using the existing caulking device. In this example, the grid had a lozenge mesh with channels $5/16$ inch wide, $1/8$ inch high and $1/2$ inch pitch between strands (i.e., the elements corresponding to elements 38*b*), and a surface void percentage of about 80%. The channels (corresponding to channels 40) extend at an angle of about 30° to the pan axis. The filter was used for filtering a phosphoric acid and gypsum slurry at 185° F., with a maximum instantaneous flow estimated at 130 gpm (gallon per minute) for the liquid and 500 cfm (cubic feet per minute) for the air.

It has been surprisingly found that despite the small passage provided by the punched plate support above the axial channel and the long path due to the angle of the channels with respect to the pan axis, there is no difference in filtration rate and efficiency between the prototype retrofit pan described above and pans of a conventional sloped bottom and punched plate construction. It has also been found that, unlike the conventional pans, no hole appeared in the filter cloth over its full lifetime and that the grid support did not scale as happens with conventional pans. Although the intention was to replace the grid at the time when the cloth is routinely changed every six weeks, this was found to be unnecessary. In fact, in the example under consideration, it was only after about five months of operation that deformation of the grid due to high temperature began and the grid was replaced. As indicated above, the grid is a very low cost item and can be manufactured quite cheaply.

In another example involving retrofitting of a similar pan, the existing cloth caulking device was replaced by one corresponding to that shown in FIG. 10. The channels were $1/2$ inch wide and $5/32$ inch high, with a $1/2$ inch pitch between strands, and extended perpendicular to the filter pan axis. The pan was observed to provide faster draining and better efficiency than conventional pans.

Although the invention has been described above in relation to preferred embodiments thereof, it will be understood by those skilled in the art that variations and modifications can be effected in these preferred embodiments without departing from the scope and spirit of the invention.

What is claimed is:

1. A filter pan construction comprising:
    a pan including side walls and a flat bottom wall having at least one filtrate drainage trough therein;
    a removable, channel-forming grid disposed on said flat bottom between said side walls, said grid comprising a plurality of spaced channel-forming elements joined together by a plurality of spaced, elongate securing elements, the filter pan having a longitudinal axis and said channel forming elements extending transversely to said longitudinal axis, each of said channel-forming elements having a first side and a second, opposite side, the first side of said channel-forming elements abutting the flat bottom of the filter pan, and said elongate securing elements being affixed to the second side of the channel-forming elements; and
    a filter cloth disposed over said grid and holding said grid in place in the pan.

2. A filter pan construction according to claim 1 wherein said grid comprises a disposable plastic grid member.

3. A filter pan construction according to claim 2 wherein said grid member is comprised of a high density polyethylene.

4. A filter pan construction according to claim 1 wherein said securing elements extend orthogonally to said channel-forming elements and longitudinally of said axis.

5. A filter pan construction according to claim 1 wherein said bottom wall includes a plurality of troughs therein.

6. A filter pan construction according to claim 5 wherein said bottom wall includes a central longitudinally extending trough and first and second further troughs disposed on opposite sides of said central trough and extending at an angle to said central trough so as to intersect said central trough at a common site along the length of said central trough.

7. A filter pan construction according to claim 1 further comprising a plurality of external reinforcement elements secured to a bottom surface of said bottom wall.

8. A filter pan construction according to claim 1 further comprising holding means for holding said filter cloth in place, said side walls including an inwardly directed bottom channel and said holding means including an elongate resilient member disposed in said bottom channel about which a portion of an edge of said filter cloth is wrapped.

9. A filter pan construction according to claim 8 wherein said elongate resilient member comprises an inflatable tube.

10. A filter pan construction comprising:
    a pan including side walls and a flat bottom wall having at least one filtrate drainage trough therein;
    a removable, channel-forming grid disposed on said flat bottom between said side walls; and
    a filter cloth disposed over said grid and holding said grid in place in the pan,
       said bottom wall including a plurality of troughs therein, said troughs including a central longitudinally extending trough and first and second further troughs disposed on opposite sides of said central trough and extending at an angle to said central trough so as to intersect said central trough at a common site along the length of said central trough.

\* \* \* \* \*